(12) United States Patent
Blumer

(10) Patent No.: US 10,231,212 B1
(45) Date of Patent: Mar. 12, 2019

(54) NOTIFICATION AND COMMAND CHARGING APPARATUS AND METHODS OF PERFORMING THE SAME

(71) Applicant: Hand Held Products, Inc., Fort Mill, SC (US)

(72) Inventor: Larry Blumer, Morris Plains, NJ (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/720,618

(22) Filed: Sep. 29, 2017

(51) Int. Cl.
*H04W 52/02* (2009.01)
*H04B 17/23* (2015.01)
*H04M 3/42* (2006.01)
*H04W 68/04* (2009.01)
*H04W 4/20* (2018.01)
*H04L 29/08* (2006.01)

(52) U.S. Cl.
CPC .......... *H04W 68/04* (2013.01); *H04L 67/26* (2013.01); *H04W 4/20* (2013.01); *H04W 52/0267* (2013.01)

(58) Field of Classification Search
CPC ... H04W 68/04; H04W 52/0267; H04W 4/20; H04L 67/26; H04M 2242/24; H04M 2215/81; H04M 3/42042; H04M 7/0033; H04B 17/23
See application file for complete search history.

(56) References Cited

U.S. PATENT DOCUMENTS

| | | | | |
|---|---|---|---|---|
| 8,340,729 | B2 * | 12/2012 | Crestol | H04M 1/6066 455/41.2 |
| 2013/0206803 | A1 | 8/2013 | Liu | |
| 2015/0303727 | A1 | 10/2015 | Jeong et al. | |
| 2016/0043584 | A1 * | 2/2016 | Sun | H01M 2/1044 320/107 |
| 2017/0063142 | A1 * | 3/2017 | Loewen | H02J 7/025 |
| 2017/0094637 | A1 * | 3/2017 | Del Toro | H04W 68/005 |

FOREIGN PATENT DOCUMENTS

WO   WO-2011/150381 A2   12/2011

\* cited by examiner

*Primary Examiner* — Andrew Wendell
(74) *Attorney, Agent, or Firm* — Alston & Bird LLP

(57) ABSTRACT

Provided are methods and apparatuses for providing a visual notification indicative of a status of a mobile device and controlling a function of the mobile device while charging the mobile device. The apparatus may receive electronic information indicative of a status of the mobile device. The apparatus may determine the status of the mobile device based on the electronic information indicative of the status of the mobile device. The apparatus may provide a visual notification based on the status and configure a command button to control the function of the mobile device based on the status. Further, in response to actuation of the command button, the apparatus may instruct the mobile device to perform the function.

20 Claims, 8 Drawing Sheets

NOTIFICATION AND COMMAND CHARGING APPARATUS AND METHODS OF PERFORMING THE SAME

BACKGROUND

Mobile communications devices such as smartphones are a multi-purpose technology that are useful for performing a wide variety of tasks. Typically, these devices do not provide adequate functionality to a user when these devices are employed statically as stationary devices, such as when charging.

Applicant has identified a number of deficiencies and problems associated with the foregoing. Through applied effort, ingenuity, and innovation, many of these identified problems have been solved by developing solutions that are included in embodiments of the present disclosure, many examples of which are described in detail herein.

SUMMARY

The present disclosure relates to an apparatus for charging a mobile device. The apparatus may include a housing, a charging circuitry to charge the mobile device, a communications circuitry to receive first electronic information indicative of a first status of the mobile device and to receive second electronic information indicative of a second status of the mobile device. The first status and the second status may be different. Further, the apparatus may include a first light source to provide a first visual notification indicative of the first status of the mobile device, a second light source to provide a second visual notification indicative of the second status of the mobile device. The first visual notification and the second visual notification may be different. The apparatus may include a first command button to control a first function of the mobile device based on the first status of the mobile device, and a second command button to control a second function of the mobile device based on the second status of the mobile device. The first function and the second function may be different. Further, the communications circuitry may transmit, to the mobile device in response to a first actuation of the first command button, a first control signal that instructs the mobile device to perform the first function. The communications circuitry may further transmit, to the mobile device in response to a second actuation of the second command button, a second control signal that instructs the mobile device to perform the second function.

The present disclosure further relates to an apparatus for providing a visual notification indicative of a status of a mobile device and controlling a function of the mobile device while charging the mobile device. The apparatus may include a housing, a charging circuitry to charge the mobile device, a communications circuitry to receive, from the mobile device, electronic information indicative of a status of the mobile device, a light source to provide a visual notification, a command button to control a function of the mobile device, and a processor in communication with the charging circuitry, the communications circuitry, the light source, and the command button. The communications circuitry may further transmit, to the mobile device, a control signal that may instruct the mobile device to perform a function. The processor may receive, from the communications circuitry, the electronic information indicative of the status of the mobile device, determine the status of the mobile device based on the electronic information indicative of the status of the mobile device, and transmit, to the light source, an instruction to provide the visual notification based on the status, and configure the command button to control the function of the mobile device based on the status. In response to an actuation of the command button by a user, the processor may receive an electronic signal indicative of the actuation of the command button by the user and transmit, to the communications circuitry in response to the electronic signal indicative of the actuation of the command button, the control signal that instructs the mobile device to perform the function.

In some embodiments, the apparatus may be configured to control a second function of the mobile device according to the status of the mobile device. For example, the control signal may be a first control signal, the function of the mobile device may be a first function of the mobile device, and the command button may be a first command button. The communications circuitry may transmit, to the mobile device, a second control signal that may instruct the mobile device to perform a second function. The apparatus may further include a second command button to control a second function of the mobile device. The processor may further configure the first command button to control the first function of the mobile device based on the status. In response to a first actuation of the first command button by the user, the processor may receive a first electronic signal indicative of the first actuation of the first command button and transmit, to the communications circuitry in response to the first electronic signal indicative of the first actuation of the first command button, the first control signal that instructs the mobile device to perform the first function. The processor may further configure the second command button to control the second function of the mobile device based on the status. In response to a second actuation of the second command button by the user, the processor may receive a second electronic signal indicative of the second actuation of the second command button and transmit, to the communications circuitry in response to the second electronic signal indicative of the second actuation of the second command button, the second control signal that may instruct the mobile device to perform the second function.

In some embodiments, the apparatus may further include an input-output circuitry to receive command button configuration information indicative of input from one or more users. Further, the command button may further control the function of the mobile device based on the command button configuration information. The processor may be in communication with the input-output circuitry. The processor may receive, from the input-output circuitry, the command button configuration information and configure the command button to control the function of the mobile device based on the status and the command button configuration information.

The present disclosure further relates to a method for providing a visual notification indicative of a status of a mobile device and controlling a function of the mobile device while charging the mobile device. The method may include charging, by charging circuitry, the mobile device, receiving, from communications circuitry, a status signal indicative of the status of the mobile device, determining, by processing circuitry, the status of the mobile device based on the status signal, and transmitting, to a light source, an instruction to provide the visual notification based on the status. The method may further include configuring a command button to control the function of the mobile device based on the status, receiving, in response to an actuation of the command button by a user, an electronic signal indicative of the actuation of the command button, and transmitting, to the communications circuitry, a control signal that instructs the mobile device to perform the function.

The present disclosure further relates to a computer program product having a non-transitory computer-readable storage medium having computer-executable program code stored therein. The computer-executable program code may include program code instructions to charge, by charging circuitry, the mobile device, cause to receive, from communications circuitry, a status signal indicative of the status of the mobile device, determine, by processing circuitry, the status of the mobile device based on the status signal, cause to transmit, to a light source, an instruction to provide the visual notification based on the status, configure a command button to control the function of the mobile device based on the status, cause to receive, in response to an actuation of the command button by a user, an electronic signal indicative of the actuation of the command button, and cause to transmit, to the communications circuitry, a control signal that instructs the mobile device to perform the function.

The above summary is provided merely for purposes of summarizing some example embodiments illustrating some aspects of the present disclosure. Accordingly, it will be appreciated that the above-described embodiments are merely examples and should not be construed to narrow the scope of the disclosure in any way. It will be appreciated that the scope of the disclosure encompasses many potential embodiments in addition to those herein summarized, some of which will be further described below.

BRIEF DESCRIPTION OF THE DRAWINGS

The accompanying drawings illustrate embodiments of the disclosure, and, together with the specification, including the general description above and the detailed description which follows, serve to explain the features of the present disclosure.

DETAILED DESCRIPTION

Figure 1:
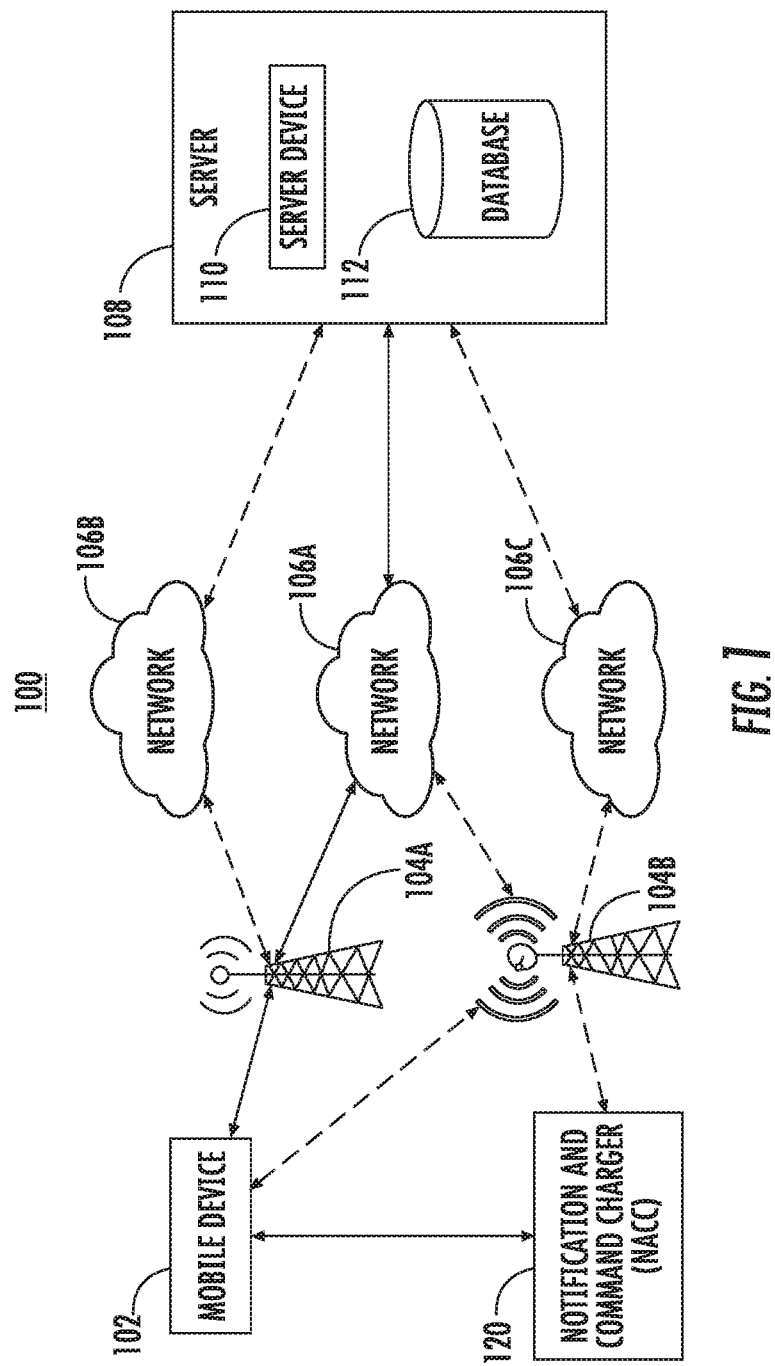
FIG. 1 illustrates a system diagram of an example implementation of some example embodiments described herein.

The present disclosure now will be described more fully with reference to the accompanying drawings in which some but not all embodiments of the disclosure are shown. Indeed, these embodiments may be embodied in many different forms and should not be construed as limited to the embodiments set forth herein; rather, these embodiments are pro-vided so that this disclosure will satisfy applicable legal requirements. Like numbers refer to like elements throughout. As used herein, terms such as "front," "rear," "top," "outside," "inside," and other similar terms are used for explanatory purposes in the examples provided below to describe the relative position of certain devices or portions of devices. Terminology used in this disclosure is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The components illustrated in the figures represent components that may or may not be present in various embodiments of the disclosure described herein such that embodiments may include fewer or more components than those shown in the figures while not departing from the scope of the disclosure.

Mobile devices, such as smartphones, are capable of a wide variety of interactions to send notifications and receive commands. These interactions may be accomplished through notification LEDs, audible notifications, buttons, haptic feedback, display, and the like. However, when a mobile devices is employed as a static and/or stationary device, such as when charging the mobile device, certain notification and/or command control functionalities may not be as effective. For example, when a smartphone is connected to a charger and kept stationary at a distance, it may be difficult to see a notification LED indicator from a distance and from every angle. Further, mobile devices, such as smartphones, may have multiple capabilities and functionalities, such as voicemail answering, speakerphone, alarm, and the like. However, the mobile devices generally lack some dedicated and large buttons for each functionality. For example, smartphones may not have tactile buttons, such as the large mute and/or end call buttons provided in dedicated conference phones, landline phone, and the like. Thus, it may be challenging for a user to get notifications from and/or interact with the mobile device when the mobile device is employed in a static mode.

The present disclosure provides notification and command charging systems and methods suitable for use in various environments, such as in a home, office building, retail store, automobile, airport, and other environments. The present disclosure may be particularly beneficial when it is desired to provide visual notifications and command control functionality per the particular status of a device, specifically a mobile device. A mobile device may be implemented as a mobile computing device, such as a laptop computer, smartphone, cellular phone, tablet computer, networked device, watch, wearable device, consumer electronics device, or other device, that may be used for any suitable purpose. In one embodiment, the mobile device may be connected to a charging apparatus that may provide notifications and command control functionalities along with charging the mobile device. Specifically, the charging apparatus may provide visual notifications, such as via a light source, corresponding to a status of the mobile device. Further, the charging apparatus may have one or more command buttons that may be configured to control a specific functionality of the mobile device based on a status of the mobile device. The one or more command buttons may be context-sensitive command buttons. For example, when the mobile device receives a new voicemail while the mobile device is connected to the charging apparatus, the charging apparatus may notify the user of the new voicemail through a visual notification provided by a light source, such as an LED disc, that is visible to the user from a large distance and from multiple angles. Further, the charging apparatus may also configure a command button to function as a read voicemail button. Hence, a user may interact with the charging apparatus for receiving notification and/or for command control functionalities while the mobile device remains in a static mode connected to the charging apparatus.

FIG. 1 illustrates a system diagram of an example implementation of some example embodiments described herein. The system 100 may include a mobile device 102 coupled to a Notification and Command Charging (NACC) device 120 for charging purposes. The mobile device 102 may be implemented as a mobile computing device, such as a laptop computer, smartphone, cellular phone, tablet computer, networked device, watch, wearable device, consumer electronics device, or other device, that may be used for any suitable purpose. Further, the mobile device 102 may be connected to a cell tower 104A, a network access point 104B, a wireless base station, or both. The NACC device 120 may also be connected to the network access point 104B or wireless base station. The cell tower 104A may be further connected to a remote server 108 through a network 106B. The NACC device 120 may be connected to the remote server 108 through a network 106C. Alternatively, both the mobile device 102 and the NACC device 120 may be connected to the remote server 108 through a same network 106A. The remote server 108 may include a server device 110 and/or a local database, such as database 112, as shown in FIG. 1. In some embodiments, remote server 108 may be provided by one or more cloud-based servers.

In accordance with some embodiments of the present disclosure, the mobile device 102, connected to the NACC device 120, may receive a change in status of the mobile device 102, such as, but not limited to, an incoming call. The term "status of the mobile device" as used herein may refer to a current event and/or condition of the mobile device 102. For example, the status of the mobile device 102 may include any one or more of the following statuses: charged, charging, call hold, call mute, incoming call, voicemail, active alarm, snoozed alarm, unread message (email/SMS), any other suitable status, or any combination thereof.

Further, the term "change in status of the mobile device" as used herein may refer to an instance when a current event and/or a condition of the mobile device is changed to a different event and/or a condition. The change in status may be in response to an external input, such as, an incoming call, or in response to an internal event, such as, an indication of full charging of a battery of the mobile device 102. In accordance with an embodiment, the mobile device 102 may transmit an indication of the change in status of the mobile device 102 to the NACC device 120. In some embodiments, the mobile device 102 may be coupled to the NACC device 120 through a wired connector, and may transmit the indication of the change in status to the NACC device 120 through the wired connector. In some embodiments, the mobile device 102 may transmit the indication of the change in status to the NACC device 120 through a wireless network, such as through the network access point 104B or wireless base station. In some other embodiments, the mobile device 102 may transmit the indication of the change in status to a remote server, such as remote server 108, and the NACC device 120 may receive the indication of the change in status of the mobile device 102 from the remote server 108.

On receiving the indication of the change in status of the mobile device 102, the NACC device 120 determines a status of the mobile device 102 based on the received indication. For example, based on the received indication, the NACC device 120 may determine that the status of the mobile device 102 is charged, charging, call hold, call mute, incoming call, voicemail, active alarm, snoozed alarm, unread message (email/SMS), any other suitable status, or any combination thereof. Further, the NACC device 120 may provide a visual indication to a user based on the determined status. The NACC device 120 may further configure a command button on the NACC device 120 to control a function of the mobile device 102 based on the determined status. In an embodiment, a user may actuate and/or press the command button to control the function of the mobile device 102. In response, the NACC device 120 may transmit a control signal as an indication of the actuation of the command button to the mobile device 102 that instructs the mobile device to perform the specific function.

Figure 2:
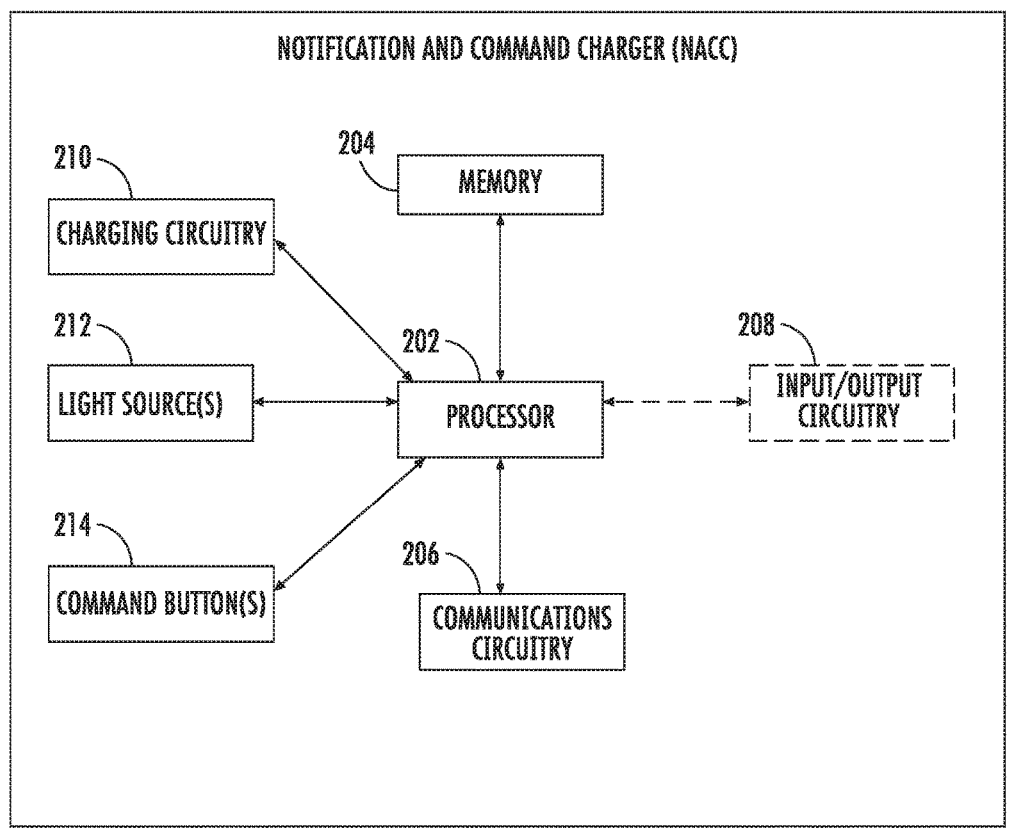
FIG. 2 illustrates a schematic block diagram of an example notification and command charging device according to an example embodiment.

FIG. 2 illustrates a schematic block diagram of an example notification and command charging device 200 according to an example embodiment. As illustrated in FIG. 1, in accordance with some example embodiments, notification and command charging device 200 can include various means, such as processor 202, memory 204, communications circuitry 206, input-output circuitry 208, charging circuitry 210, one or more light sources 212, and/or one or more command buttons 214. As referred to herein, "circuitry" includes hardware, software and/or firmware configured to perform one or more particular functions. In this regard, the means of notification and command charging device 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 202 comprises a plurality of processors. The plurality of processors may be embodied on a single computing device or may be distributed across a plurality of computing devices collectively configured to function as notification and command charging device 200. The plurality of processors may be in operative communication with each other and may be collectively configured to perform one or more functionalities of notification and command charging device 200 as described herein. In an example embodiment, processor 202 is configured to execute instructions stored in memory 204 or otherwise accessible to processor 202. These instructions, when executed by processor 202, may cause notification and command charging device 200 to perform one or more of the functionalities of notification and command charging device 200 as described herein.

Whether configured by hardware, firmware/software methods, or by a combination thereof, processor 202 may comprise an entity capable of performing operations according to embodiments of the present disclosure while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations described herein, such as those discussed in connection with FIGS. 1-7.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 204 may be configured to store information, data (including item data and/or profile data), applications, instructions, or the like for enabling notification and command charging device 200 to carry out various functions in accordance with example embodiments of the present disclosure. For example, in at least some embodiments, memory 204 is configured to buffer input data for processing by processor 202. Additionally or alternatively, in at least some embodiments, memory 204 is configured to store program instructions for execution by processor 202. Memory 204 may store information in the form of static and/or dynamic information. This stored information may be stored and/or used by notification and command charging device 200 during the course of performing its functionalities.

Communications circuitry 206 may be embodied as any device or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device and/or network, such as, for example, a mobile device or a remote server. In some embodiments, communications circuitry 206 (like other components discussed herein) can be at least partially embodied as or otherwise controlled by processor 202. In this regard, communications circuitry 206 may be in communication with processor 202, such as via a bus. Communications circuitry 206 may include, for example, a USB connector, a micro USB connector, an antenna, a transmitter, a receiver, a transceiver, network interface card and/or supporting hardware and/or firmware/software for enabling communications with another computing device. Communications circuitry 206 may be configured to receive and/or transmit any data that may be stored by memory 204 using any protocol that may be used for communications between computing devices. Communications circuitry 206 may additionally or alternatively be in communication with the memory 204, input-output circuitry 208 and/or any other component of notification and command charging device 200, such as via a bus.

In some embodiments, the communications circuitry 206 may receive indications of status of a coupled mobile device, such as the mobile device 102, as shown in FIG. 1. The status of the mobile device may include an incoming call, a voicemail, alarm, and the like. The communications circuitry 206 may receive the indications through any suitable communication interface, such as, but not limited to USB On-The-Go (OTG). The NACC device 200 when connected to a mobile device through the USB OTG connection may switch back and forth between roles of a host and a slave device. For example, when the NACC device 200 supplies power to a coupled mobile device, the NACC device 200 acts as a host while the mobile device functions as a slave device. In this regard, the NACC device 200 may include a power cable with a USB connector at one end and a standard power plug on the other end. The USB connector may be, for example, a USB 2.0 connector, a USB 3.0 connector, a USB 3.1 connector, a USB-C connector, a micro-USB connector, a mini-USB connector, or any other USB connector. The USB connector may be attached to any suitable communications interface or port in the mobile device. In some embodiments, the communications circuitry 206 may include wireless communications circuitry and receive an indication of a status of a mobile device from a wireless network. Wireless communications circuitry may include, for example, a Bluetooth antenna or transceiver, a Wi-Fi antenna or transceiver, a radio-frequency identification (RFID) antenna or transceiver, any other suitable wireless communications circuitry, or any combination thereof. In this regard, the NACC device 200 may further include a Bluetooth transceiver for communicating with a connected device, such as the mobile device 102, as shown in FIG. 1. Further, the communications circuitry 206 may transmit control signals to a connected device. As shown in FIG. 2, the NACC device 200 may include command button 214. A user may actuate the command button 214 by, for example, touch, voice, sound, gesture, movement, any other suitable actuation technique, or any combination thereof. When a user actuates the command button 214, the communications circuitry 206 may transmit a corresponding control signal to a coupled mobile device instructing the mobile device to control a function based on the control signal. The control signal may be transmitted by the communications circuitry 206 over any suitable communications interface, such as, but not limited to, USB OTG and/or Bluetooth. In some embodiments, the communications circuitry 206 may receive first electronic information and second electronic information from a mobile device, such as mobile device 102 shown in FIG. 1. In some embodiments, the communications circuitry 206 may transmit a first control signal and a second control signal to the mobile device. In some embodiments, the communications circuitry 206 may receive the electronic information indicative of the status of the mobile device from a remote server, such as remote server 108 shown in FIG. 1.

Input-output circuitry 208 may be in communication with processor 202 to receive an indication of a user input (e.g., command button configuration information) and/or to provide an audible, visual, mechanical, or other output to a user (e.g., employee and/or customer). Some example visual outputs that may be provided to a user by notification and command charging device 200 are discussed in connection with FIGS. 1-7. As such, input-output circuitry 208 may include support, for example, for a keyboard, a mouse, a joystick, a display, a touch screen display, a microphone, a speaker, a RFID reader, barcode reader, biometric scanner, and/or other input/output mechanisms. In some embodiments, the input-output circuitry 208 may include a microphone for receiving voice commands from a user. The input-output circuitry 208 and the processor 202 may process received audio signals to determine voice commands. Further, the input-output circuitry 208 may include haptic sensors, gesture sensors, motion sensors, sound sensors, a combination of touch and voice command circuitry, any other suitable sensors or circuitry, or any combination thereof. In some embodiments (like other components discussed herein), input-output circuitry 208 may even be eliminated from notification and command charging device 200. Alternatively, such as in embodiments wherein a portion of notification and command charging device 200 is embodied as a server or database, at least some aspects of input-output circuitry 208 may be embodied on an apparatus, such as a mobile device, used by a user that is in communication with notification and command charging device 200. Input-output circuitry 208 may be in communication with the memory 204, communications circuitry 206, and/or any other component of notification and command charging device 200, such as via a bus. One or more than one input-output circuitry and/or other component can be included in or coupled to notification and command charging device 200. In some embodiments, the input-output circuitry 208 may receive a command from a user to control a function of the mobile device. For example, a user may provide an input through a touch screen display of the NACC device 200. The input-output circuitry 208 may provide an indication of the received command to the processor 202. The processor 202 may configure a command button 214 that controls a specific function of the mobile device, to control a different function of the mobile device based on the command received by the input-output circuitry 208. The communications circuitry 206 may then transmit a control signal to the mobile device that may instruct the mobile device to perform the new function.

Charging circuitry 210 may be embodied as any device or means embodied in circuitry, hardware, a computer program product comprising computer readable program instructions stored on a computer readable medium (e.g., memory 204) and executed by a processing device (e.g., processor 202), or a combination thereof that is configured to receive and/or transmit energy from/to another device, such as, for example, a mobile device. In some embodiments, charging circuitry 210 (like other components discussed herein) can be at least partially embodied as or otherwise controlled by processor 202. In this regard, charging circuitry 210 may be in communication with processor 202, such as via a bus.

In some embodiments, charging circuitry 210 may include a USB connector and an electrical plug. In some embodiments, charging circuitry 210 may include a wireless charger to wirelessly charge the mobile device. Charging circuitry 210 may include, for example, a USB connector, a micro USB connector, an electrical plug, a 120 VAC plug, a 240 VAC plug, a wireless charger, an inductive charger, a Qi inductive charger, and/or supporting hardware and/or firmware/software for enabling wired or wireless charging to another device. The USB connector may be, for example, a USB 2.0 connector, a USB 3.0 connector, a USB 3.1 connector, a USB-C connector, a micro-USB connector, a mini-USB connector, or any other USB connector. Charging circuitry 210 may be configured to receive and/or transmit any data that may be stored by memory 204 using any protocol that may be used for communications between computing devices. Charging circuitry 210 may additionally or alternatively be in communication with the memory 204, input-output circuitry 208 and/or any other component of notification and command charging device 200, such as via a bus. In some embodiments, the NACC device 200 may include a charger for providing power to a coupled mobile device. In this instance, the Charging circuitry 210 may include all required charging components, such as, but not limited to, resistors, voltage regulators, rectifier diode, and the like. In other embodiments, the NACC device 200 may be employed as a peripheral device between a charging device and the mobile device. In this instance, the charging circuitry 210 may be eliminated from the NACC device 200, and/or the charging circuitry 210 may provide limited charging functionality. For example, the charging circuitry 210 may provide voltage stabilization and/or regulation to convert the voltage supplied by the charging device to an appropriate voltage level suitable to the mobile device. In an embodiment, the charging circuitry 210 and a separate charging device may both be capable of providing charge to the mobile device, separately and/or simultaneously.

One or more light sources 212 may be embodied as any device or means embodied in circuitry, hardware, a computer program product comprising computer readable program instructions stored on a computer readable medium (e.g., memory 204) and executed by a processing device (e.g., processor 202). In some embodiments, the one or more light sources 212 may include an LED array, such as a cylindrical LED array, a rectangular LED array, a circular disc with LEDs, and the like. In an embodiment, the one or more light sources 212 may include a LED notification disc having one or more LEDs, an LED array, and/or an optical waveguide.

In some embodiments, the one or more light sources 212 may include an LED notification disc. In some embodiments, the LED notification disc may include an LED array. In some embodiments, the LED notification disc may include an optical waveguide. In some embodiments, the LED notification disc may include one or more LEDs coupled to, or in contact with, one or more optical waveguides. The one or more light sources 212 may have LEDs of a single color and/or multiple colors. The one or more light sources 212 may provide a visual notification to a user. The term "visual notification" may refer to any suitable visual notification, including the solid and blinking light notifications as well as color changing and pulsating light notifications. For example, the one or more light sources 212 may provide a visual notification to a user through a solid light, a blinking light, a pulsating light, a color changing light, or any combination thereof. In some embodiments, different notifications may be presented differently by the one or more light sources 212. For example, for an incoming call notification, the one or more light sources 212 may light the LED disc in solid light, whereas for an incoming text message, the one or more light sources 212 may light the LED disc in a blinking pattern. Further, it should be noted that the one or more light sources 212 is not limited to LED disc, and may include LED in contact with a translucent plastic disc, projections onto a ceiling or a wall, transmission to a wearable device, such as a watch, set of glasses, fitness tracker, and the like.

One or more command buttons 214 may be embodied as any device or means embodied in circuitry, hardware, a computer program product comprising computer readable program instructions stored on a computer readable medium (e.g., memory 204) and executed by a processing device (e.g., processor 202). In some embodiments, the command buttons 214 may include multiple buttons provided on the housing of the NACC device 200. In an embodiment, the command buttons 214 may be hard buttons that are pressed and/or actuated in a different manner by a user. In some embodiments, the command buttons 214 may be soft and/or virtual buttons, such as on a touch screen display on the input-output circuitry 208. In further embodiments, the command buttons 214 may include haptic sensors, gesture sensors, motion sensors, sound sensors, voice command circuitry, photodetectors, cameras, and the like. As describes earlier, a user may actuate the command buttons 214 to provide a control signal to control a function of the mobile device. In some embodiments, one or more of the one or more command buttons 214 may be a tactile command button. In some embodiments, one or more of the one or more command buttons 214 may be a context-sensitive command button.

In some embodiments, one or more components of the notification and command charging device 200 may transmit one or more control signals, electronic signals, information, or data to a mobile device, such as mobile device 102 shown in FIG. 1, that instruct the mobile device to provide a visual notification indicative of the status of the mobile device. In some embodiments, the mobile device may be a first mobile device. One or more components of the notification and command charging device 200 may transmit one or more control signals, electronic signals, information, or data to a second mobile device, such as another mobile device 102 shown in FIG. 1, that instruct the second mobile device to provide a visual notification indicative of the status of the first mobile device. For example, the first mobile device may be a smartphone and the second mobile device may be a watch. one or more components of the notification and command charging device 200 may transmit a control signal to the watch that instructs the watch to provide a visual notification indicative of the status of the mobile phone. In an example, in response to the smartphone receiving an incoming call, one or more components of the notification and command charging device 200 may transmit a control signal to the watch that instructs the watch to emit a blinking light, such as by changing all or a portion of the watch to emit the blinking color green. In another example, in response to the smartphone receiving a new e-mail, one or more components of the notification and command charging device 200 may transmit a control signal to the watch that instructs the watch to emit a solid light, such as by changing all or a portion of the watch to emit the color yellow.

In some embodiments, one or more components of the notification and command charging device 200 may be provided as a dock, a vehicle mount, a wall mounted module, a thermostat, a refrigerator, a monitoring device, a security system, an appliance, a system of connected appliances or devices, an industrial or manufacturing device, or any other suitable device, apparatus or system.

In some embodiments, some or all of the functionality of notification and command charging device 200 may be performed by processor 202. In this regard, the example processes and algorithms discussed herein can be performed by at least one processor 202. For example, non-transitory computer readable media can be configured to store firmware, one or more application programs, and/or other software, which include instructions and other computer-readable program code portions that can be executed to control each processor (e.g., processor 202) of the components of notification and command charging device 200 to implement various operations, including the examples shown above. As such, a series of computer-readable program code portions are embodied in one or more computer program goods and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor, or other programmable circuitry that execute the code on the machine create the means for implementing various functions, including those described herein.

It is also noted that all or some of the information presented by the examples discussed herein can be based on data that is received, generated and/or maintained by one or more components of a local or networked system and/or notification and command charging device 200. In some embodiments, one or more external systems (such as one or more remote servers, cloud-based servers and/or data storage systems) may also be leveraged to provide at least some of the functionality discussed herein.

As described above and as will be appreciated based on this disclosure, embodiments of the present disclosure may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present disclosure have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as notification and command charging device 200 and/or processor 202 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 3A:
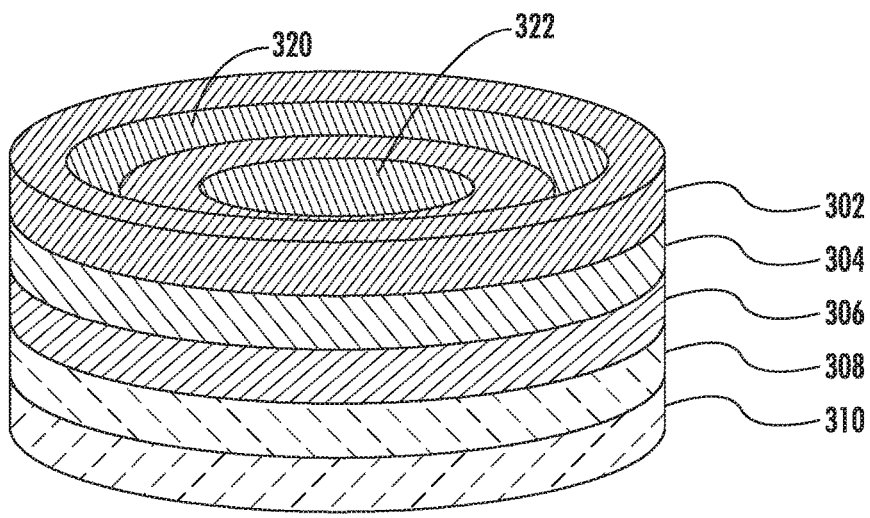
FIGS. 3A and 3B illustrate an example notification and command charging device according to example embodiments.
Figure 3B:
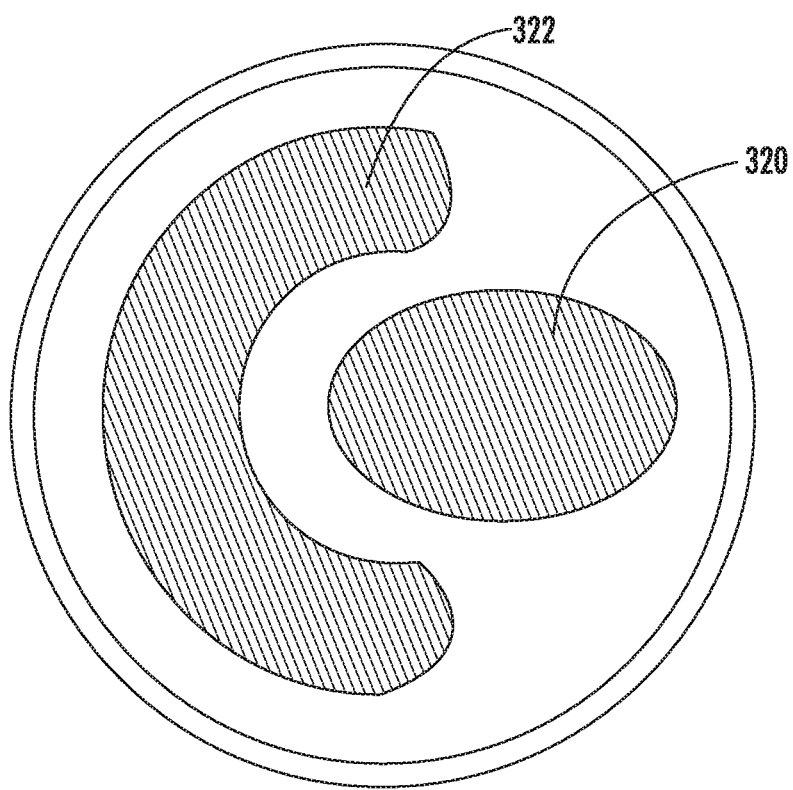

FIGS. 3A and 3B illustrate an example notification and command charging (NACC) device according to example embodiments. In the embodiment illustrated in FIG. 3A, notification and command charging device 300 may be cylindrical in shape and may have LED notification discs 302, 304, 306, 308, and 310 and command buttons 320 and 322. In some embodiments, two or more of notification discs 302, 304, 306, 308, and 310 may be of the same or similar color, radius, and thickness. Alternatively, two or more of notification discs 302, 304, 306, 308, and 310 may be of different colors, radii, or thicknesses. Thus, each of notification discs 302, 304, 306, 308, and 310 may be used by the NACC device 300 to provide several visual notifications to a user. In an embodiment, the notification disc 302, 304, 306, 308, and 310 may provide notifications for a change in status of a mobile device. For example, when the mobile device transmits an indication of an active alarm to the NACC device 300, the NACC device 300 may activate one, all, or a combination of notification disc 302, 304, 306, 308, and 310 to provide an indication of the active alarm to a user. Further, all notification disc 302, 304, 306, 308, and 310 may correspond to different indications. For example, notification disc 302 may be used by the NACC device 300 to provide notification of an incoming call, notification disc 304 may be used to provide a notification of a voicemail, and so on. Further, the notification disc 302, 304, 306, 308, and 310 may be activated as a solid light source, or may be activated in a blinking pattern. Thus, the NACC device 300 may provide several notifications to a user by varying the activation, color, blinking pattern, and the like, for each of the notification discs 302, 304, 306, 308, and 310. Moreover, due to the cylindrical shape of the array of notification disc 302, 304, 306, 308, and 310, a user may be able to view any notification from a distance and from multiple angles.

In some embodiments, the NACC device 300 may also include command buttons 320 and 322, as shown in FIG. 3A. Command buttons 320 and 322 may be located on the top of the cylindrical LED disc, as two separate hard and/or soft buttons, or as co joined buttons, as shown in FIG. 3A. It should be noted that the command buttons 320 and 322 are not limited to buttons as shown in FIG. 3A, and the command buttons may be located anywhere on the NACC device 300, such as, on the LED discs, for example. For example, FIG. 3B shows a top-down view of the NACC device 300 having an alternate configuration for command buttons 320 and 322. A user may actuate the command buttons 320 and 322 to control a function of the mobile device coupled to the NACC device 300. In some embodiments, one or both of the command buttons 320 and 322 may be a tactile command button. In some embodiments, one or both of the one or more command buttons 320 and 322 may be a context-sensitive command button.

Figure 4:
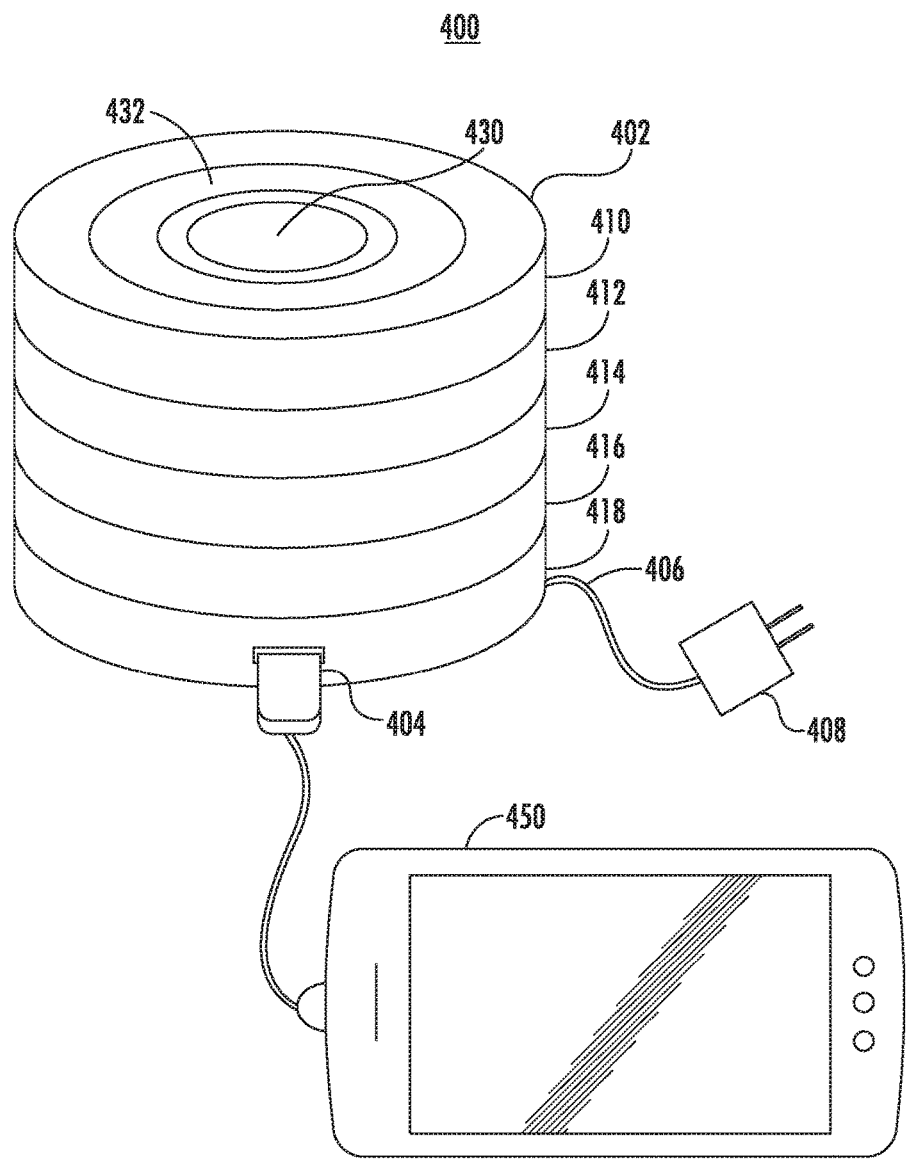
FIG. 4 illustrates an example notification and command charging device according to an example embodiment.

FIG. 4 illustrates an example notification and command charging device according to an example embodiment. In the embodiment illustrated in FIG. 4, notification and command charging device 400 has rectangular prismatic housing 402, interface 404, power cord 406, and electric plug 408 (e.g., 120 VAC plug, 240 VAC plug). In some embodiments, interface 404 may provide charging functionality, communications functionality, or both between notification and charging device 400 and mobile device 450. In some embodiments, interface 404 may be a USB connector, such as a USB 2.0 connector, a USB 3.0 connector, a USB 3.1 connector, a USB-C connector, a micro-USB connector, a mini-USB connector, or any other USB connector. In some embodiments, interface 404 may be embodied by a wireless charger, a wireless communications device (e.g., Bluetooth, etc.), or both. For example, interface 404 may include an inductive charger, a Qi inductive charger, a Bluetooth antenna or transceiver, a Wi-Fi antenna or transceiver, a radio-frequency identification (RFID) antenna or transceiver, any other suitable circuitry, or any combination thereof. Notification and command charging device 400 also has light sources 410, 412, 414, 416, and 418 and command buttons 430 and 432. In accordance with some embodiments of the present disclosure, the notification and command charging device 400 may provide power for charging to a mobile device 450 through the interface 404. Further, the notification and command charging device 400 may transmit and receive data, such as status data, to and from the mobile device 450 through the interface 404. In other embodiments, the notification and command charging device 400 may transmit and receive data, such as status data, to and from the mobile device 450 through a wireless communication link.

Figure 5:
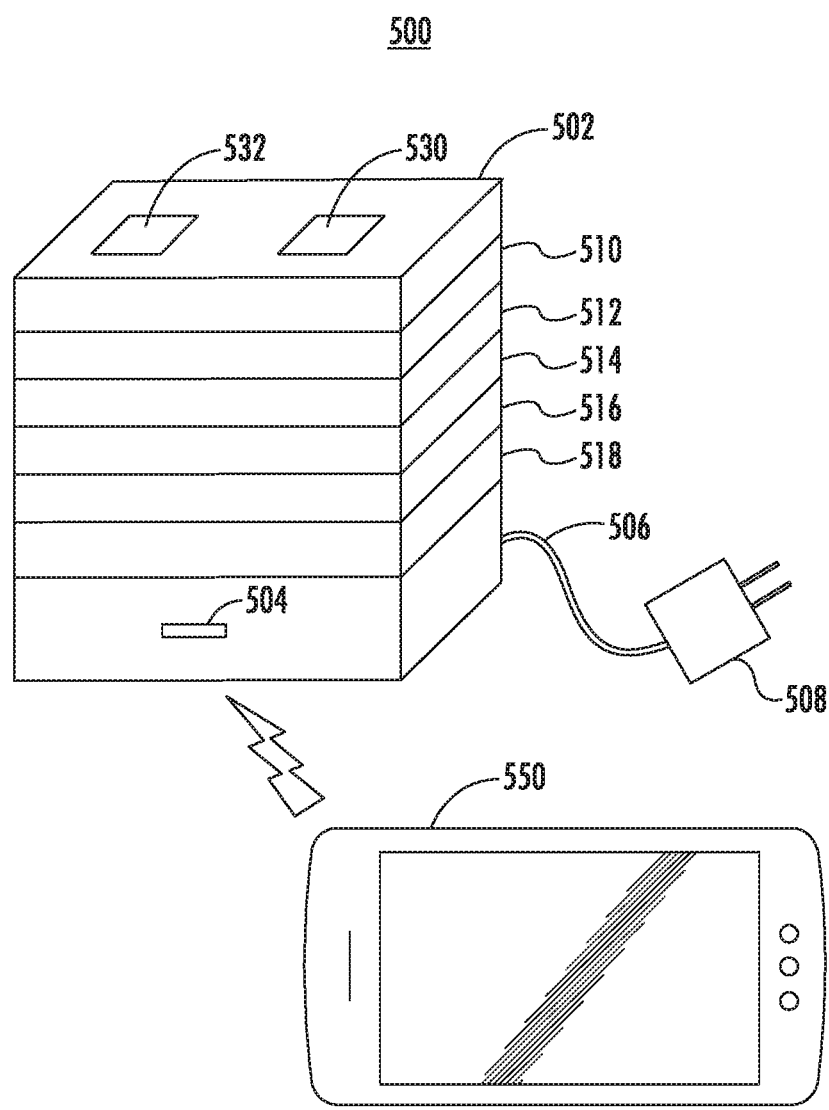
FIG. 5 illustrates an example notification and command charging device according to an example embodiment.

FIG. 5 illustrates an example notification and command charging device according to an example embodiment. In the embodiment illustrated in FIG. 5, notification and command charging device 500 has rectangular housing 502, interface 504, power cord 506, and electric plug 508 (e.g., 120 VAC plug, 240 VAC plug). In some embodiments, interface 504 may provide charging functionality, communications functionality, or both between notification and charging device 500 and mobile device 550. In some embodiments, interface 504 may be a USB connector, such as a USB 2.0 connector, a USB 3.0 connector, a USB 3.1 connector, a USB-C connector, a micro-USB connector, a mini-USB connector, or any other USB connector. In some embodiments, interface 504 may be embodied by a wireless charger, a wireless communications device (e.g., Bluetooth, etc.), or both. For example, interface 504 may include an inductive charger, a Qi inductive charger, a Bluetooth antenna or transceiver, a Wi-Fi antenna or transceiver, a radio-frequency identification (RFID) antenna or transceiver, any other suitable circuitry, or any combination thereof. Notification and command charging device 500 also has light sources 510, 512, 514, 516, and 518 and command buttons 530 and 532. In accordance with some embodiments of the present disclosure, the notification and command charging device 500 may provide power for charging to a mobile device 550 through the interface 504. Further, the notification and command charging device 500 may transmit and receive data, such as status data, to and from the mobile device 550 through the interface 504.

Although FIGS. 4-5 illustrate example shapes for the housing, light sources, and command buttons of a notification and command charging device, various changes may be made to the shapes and/or form factor of the housing, light sources, and/or command buttons.

Figure 6:
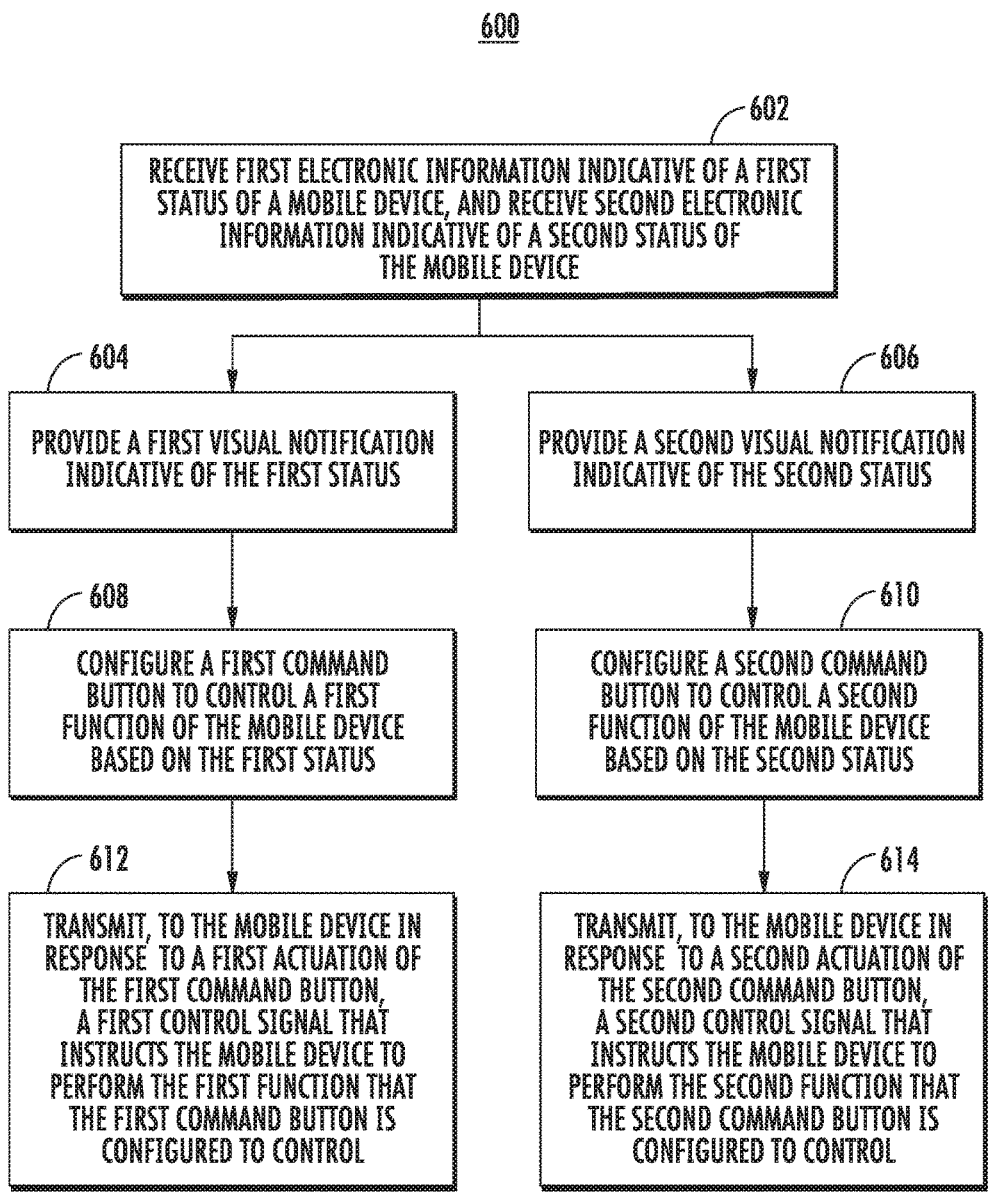
FIG. 6 illustrates an example method for providing a visual notification indicative of a status of a mobile device and controlling a function of the mobile device while charging the mobile device according to an example embodiment.
Figure 7:
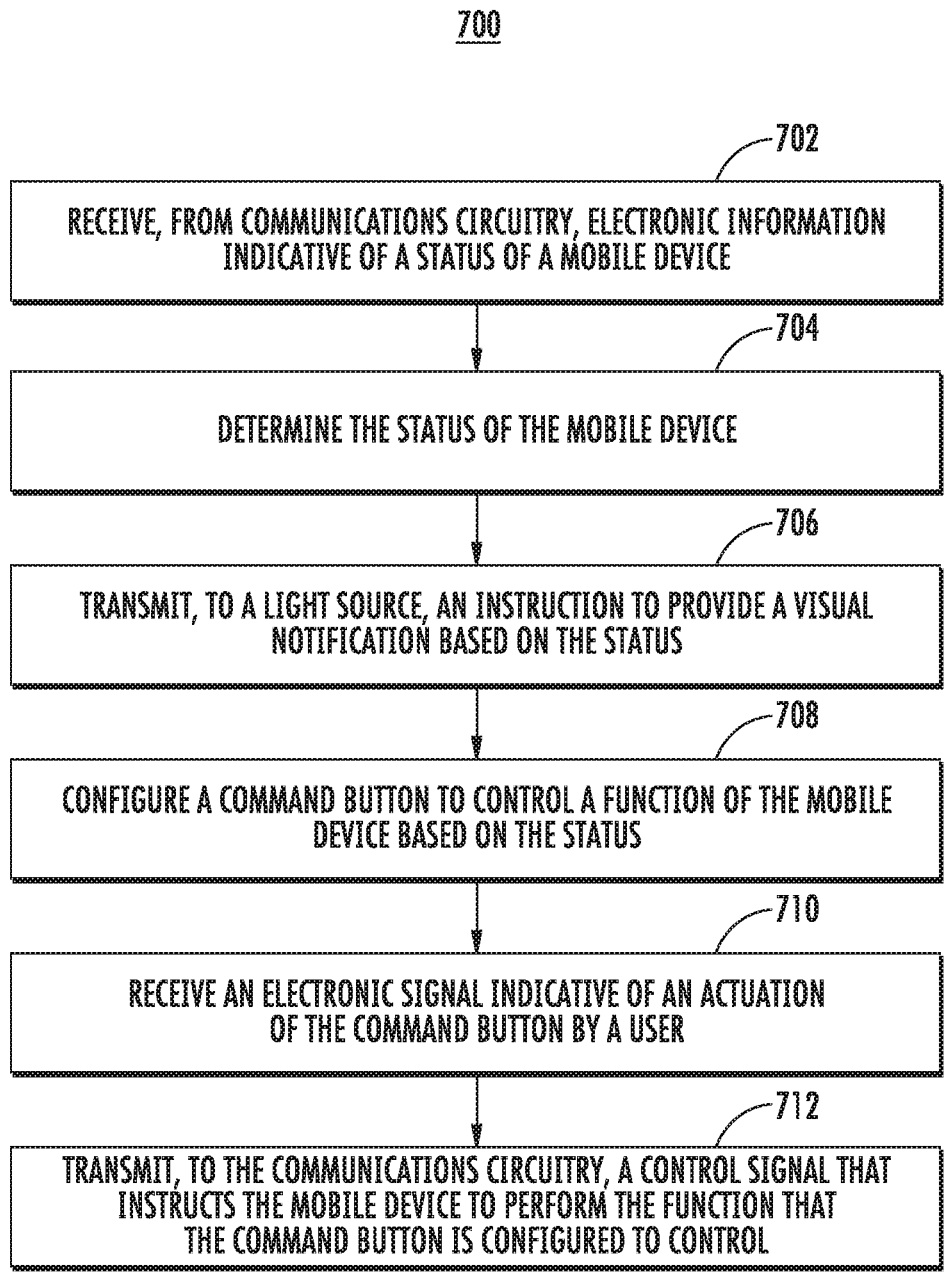
FIG. 7 illustrates an example method for providing a visual notification indicative of a status of a mobile device and controlling a function of the mobile device while charging the mobile device according to an example embodiment.

FIGS. 6-7 illustrate example flowcharts of the operations performed by an apparatus, such as a user device, in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present disclosure and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6-7 when executed, convert a computer or processing circuitry into a particular machine configured to perform an example embodiment of the present disclosure. Accordingly, the operations of FIGS. 6-7 define an algorithm for configuring a computer or processor, to perform an example embodiment. In some cases, a general purpose computer may be provided with an instance of the processor which performs the algorithm of FIGS. 6-7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and other similar words are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more example aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

FIG. 6 illustrates an example method 600 for providing a visual notification indicative of a status of a mobile device and controlling a function of the mobile device while charging the mobile device according to an example embodiment. The method 600 may include receiving a first electronic information indicative of a first status of the mobile device and a second electronic information indicative of a second status of the mobile, at block 602.

In some embodiments, the first status and the second status may be the same or substantially similar. In some embodiments, the first status and the second status may be different. In some embodiments, the first status of the mobile device may be indicative of an incoming call, and the second status of the mobile device may be indicative of an active alarm. In some embodiments, the status of the mobile device may include any one or more of the following statuses: charged, charging, call hold, call mute, incoming call, voicemail, active alarm, snoozed alarm, unread message (email/SMS), or any combination thereof. For example, the first status may be an incoming call, and the second status may be an unread message. In some embodiments, the communications circuitry 206 of the NACC device 200 may receive the first electronic information indicative of a first status and the second electronic information indicative of a second status directly from the mobile device, such as through USB, Wi-Fi, and/or Bluetooth, or from a remote or cloud-based server, such as a remote voicemail and/or email server. On receiving the first electronic information and the second electronic information, the method proceeds to block 604.

At block 604, the method may include providing a first visual notification indicative of the first status of the mobile device, at block 604. The NACC device 300, 400, and 500, may include one or more light sources as described above. The term "light source," as described herein, may refer to any suitable light source for providing a visual notification indicative of the status of the mobile device, including one or more of the one or more light sources 212, as shown in FIG. 2, and the LED notification discs 302, 304, 306, 308, and 310, as shown in FIG. 3A. For example, the first light source may be the LED notification disc 302 and the second light source may be the LED notification disc 304. In some instances, the light source may be an LED array or a single LED coupled to an optical waveguide. The term "visual notification," as described herein, may refer to any suitable visual notification, including the solid and blinking light notifications as well as color changing and pulsating light notifications, as described above with reference to FIGS. 3-5. The term "status of the mobile device" as used herein, may refer to any suitable status of the mobile device, such as but not limited to, charged, charging, call hold, call mute, incoming call, voicemail, active alarm, snoozed alarm, and unread message. The method 600 may further include providing a second visual notification indicative of the second status of the mobile device, at block 606.

In some embodiments, the first visual notification and the second visual notification may be the same or substantially similar. In some embodiments, the first visual notification and the second visual notification may be different. For example, the first visual notification may be a red light, and the second visual notification may be a blue light provided by one or more of the LED notification discs 302, 304, 306, 308, and 310, as shown in FIG. 3A. In another example, the first visual notification may be a solid light, and the visual notification may be a blinking light, as described above. In some embodiments, the first visual notification may include a first color of light. The second visual notification may include a second color of light. Further, the first color and the second color may be different. For example, the first color may be red and the second color may be yellow, green, blue, purple, or white. In another example, the first color may be yellow and the second color may be red, green, blue, purple, or white. In another example, the first color may be green and the second color may be red, yellow, blue, purple, or white. In another example, the first color may be blue and the second color may be red, yellow, green, purple, or white. In another example, the first color may be purple and the second color may be red, yellow, green, blue, or white. In another example, the first color may be white and the second color may be red, yellow, green, blue, or purple. In some embodiments, the first color of light may have a first intensity of light and the second color of light may have a second intensity of light. For example, the first color of light may have at a first intensity, and the second color of light may have a second intensity that is less than or greater than the first intensity. In some embodiments, the first visual notification may include a solid light, and the second visual notification may include a blinking light, a pulsating light, a color changing light, or any combination thereof. In some embodiments, the first visual notification may include a blinking light, and the second visual notification may include a solid light, a pulsating light, a color changing light, or any combination thereof. In some embodiments, the first visual notification may include a pulsating light, and the second visual notification may include a solid light, a blinking light, a color changing light, or any combination thereof. In some embodiments, the first visual notification may include a color changing light, and the second visual notification may include a solid light, a blinking light, a pulsating light, or any combination thereof.

The method 600 may further include configuring a first command button to control a first function of the mobile device based on the first status of the mobile device, at block 608. In an embodiment, a user may actuate the first command button, such as command button 320 or 322, as shown in FIG. 3A of the NACC device 300, to control a first function of the mobile device. For example, the first function may be "answer on speakerphone" when the first status is "incoming call," or the first function may be "end call" when the first status is "active call." Further, the method 600 may include configuring a second command button to control a second function of the mobile device based on the second status of the mobile device, at block 610. In an embodiment, a user may actuate the second command button, such as command button 320 or 322, as shown in FIG. 3A of the NACC device 300, to control a second function of the mobile device. For example, the second function may be "snooze" when the second status is "alarm active." In some embodiments, the first function and the second function may be different, and may be controlled by different command buttons. For example, command button 320 may be used to control the first function of the mobile device and command button 322 may be used to control the second function of the mobile device.

The method 600 may further include transmitting, to the mobile device in response to a first actuation of the first command button, a first control signal that instructs the mobile device to perform the first function, at block 612, and transmitting, to the mobile device in response to a second actuation of the second command button, a second control signal that instructs the mobile device to perform the second function, at block 614. In an embodiment, the communications circuitry 206 of the NACC device 200 may transmit the control signals directly to the mobile device, such as through USB, Wi-Fi, and/or Bluetooth, or from a remote or cloud-based server, such as a remote voicemail and/or email server. The control signals may be used to control a specific function of the mobile device based on the status of the mobile device. For example, when the first command button 320 may control an incoming call function of the mobile device, the first control signal may instruct the mobile device to answer the incoming call. In another example, when the second command button 322 may control an active alarm function of the mobile device, the second control signal may instruct the mobile device to snooze the active alarm. Thus, a user may receive visual notifications indicative of status of the mobile device, and may control one or more functions of the mobile device based on the status, as described by method 600.

In some embodiments, the first command button, such as command button 320 shown in FIG. 3A, may control an incoming call function of the mobile device, such as mobile device 102 shown in FIG. 1, and the first control signal may instruct the mobile device to answer the incoming call or send the incoming call to voicemail. In some embodiments, the first command button may control an active call function of the mobile device, and the first control signal may instruct the mobile device to mute the active call or end the active call. In some embodiments, the second command button such as command button 322 shown in FIG. 3A, may control an active alarm function of the mobile device, and the second control signal may instruct the mobile device to snooze the active alarm. In some embodiments, the first command button, the second command button, or both may be configurable by a processor, such as processor 202 shown in FIG. 2, based on input from one or more users. Further, the first command button, the second command button, or both may be employed in vertical applications for a wide variety of functions.

FIG. 7 illustrates an example method 700 for providing a visual notification indicative of a status of a mobile device and controlling a function of the mobile device while charging the mobile device according to another example embodiment. The method 700 may include receiving an electronic information indicative of the status of the mobile device, at block 702. In an embodiment, the processor 202 may receive the electronic information indicative of the status of the mobile device from the communications circuitry 206, as shown in FIG. 2. In some embodiments, the communications circuitry 206 of the NACC device 200 may receive the electronic information indicative of the status directly from the mobile device, such as through USB, Wi-Fi, and/or Bluetooth, or from a remote or cloud-based server, such as a remote voicemail and/or email server. On receiving the electronic information indicative of the status of the mobile device, the method may proceed to block 704. At block 704, the method may include determining the status of the mobile device based on the electronic information indicative of the status of the mobile device. In an embodiment, the processor 202 may determine the status of the mobile device. As described above, status of the mobile device may refer to any suitable status of the mobile device, such as but not limited to, charged, charging, call hold, call mute, incoming call, voicemail, active alarm, snoozed alarm, and unread message.

The method may further include transmitting, to a light source, an instruction to provide a visual notification based on the status, at block 706. The NACC device 300, 400, and 500, may include one or more light sources as described above, such as one or more of the one or more light sources 212, as shown in FIG. 2, and the LED notification discs 302, 304, 306, 308, and 310, as shown in FIG. 3A. In an embodiment, the processor 202 may transmit an instruction to one or each of the LED notification discs 302, 304, 306, 308, and 310 to provide a visual notification to a user. Visual notification may refer to any suitable visual notification, including the solid and blinking light notifications as well as color changing and pulsating light notifications, as described above with reference to FIGS. 3-5. For example, the visual notification may be a red light provided by one or more of the LED notification discs 302, 304, 306, 308, and 310, as shown in FIG. 3A, indicating an incoming call. In another example, the visual notification may be a solid light, or a blinking light, indicating an unread message.

The method 700 may further include configuring the command button to control the function of the mobile device based on the status, at block 708. In an embodiment, the processor 202 may configure the command buttons 320 and 322 based on the status of the mobile device. For example, the function may be "answer on speakerphone" when the status is "incoming call," or the function may be "end call" when the status is "active call." The method 700 may further include receiving, in response to an actuation of the command button by a user, an electronic signal indicative of the actuation of the command button by the user, at block 710. In an embodiment, a user may actuate a command button, such as command buttons 320 and 322, as shown in FIG. 3A of the NACC device 300 to control a function of the mobile device. In an embodiment, the processor 202 may receive an electronic signal indicative of the actuation of the command button 320 and/or 322 by the user. The method 700 may further include transmitting the control signal that instructs the mobile device to perform the function, at block 712. In an embodiment, the processor 202 may transmit the control signal to the communications circuitry 206 of the NACC device 200. The control signal may be used to control a specific function of the mobile device based on the status of the mobile device. For example, when the command button 320 and/or 322 may control an incoming call function of the mobile device, the control signal may instruct the mobile device to answer the incoming call. In another example, when the command button 320 and/or 322 may control an active alarm function of the mobile device, the control signal may instruct the mobile device to snooze the active alarm. Thus, the NACC device 200 may provide visual notifications indicative of status of the mobile device, and generate control signals to control one or more functions of the mobile device based on the status, as described by method 700.

In some embodiments, the control signal, as described above, may be a first control signal, the function of the mobile device may be a first function of the mobile device, the command button may be a first command button. In this regard, the method 700 may further include transmitting, to the mobile device, a second control signal that may instruct the mobile device to perform a second function. Further, the processor 202 may configure a first command button 320 to control the first function of the mobile device based on the status, receive, in response to a first actuation of the first command button by the user, a first electronic signal indicative of the first actuation of the first command button, and transmit, to the communications circuitry in response to the first electronic signal indicative of the first actuation of the first command button 320. In an embodiment, the first control signal may instruct the mobile device to perform the first function. The processor 202 may further configure the second command button 322 to control the second function of the mobile device based on the status, receive, in response to a second actuation of the second command button by the user, a second electronic signal indicative of the second actuation of the second command button, and transmit, to the communications circuitry in response to the second electronic signal indicative of the second actuation of the second command button 322. The second control signal may instruct the mobile device to perform the second function.

In some embodiments, the status of the mobile device, such as mobile device 102 shown in FIG. 1, may be indicative of an incoming call. The processor, such as processor 202 shown in FIG. 2, may configure the first command button, such as command button 320 shown in FIG. 3A, to control a first incoming call function of the mobile device and the first control signal may instruct the mobile device to answer the incoming call. The processor may further configure the second command button, such as command button 322 shown in FIG. 3A, to control a second incoming call function of the mobile device, and the second control signal may instruct the mobile device to send the incoming call to voicemail.

In some embodiments, the status of the mobile device, such as mobile device 102 shown in FIG. 1, may be indicative of an active call. The processor, such as processor 202 shown in FIG. 2, may configure the first command button, such as command button 320 shown in FIG. 3A, to control a first active call function of the mobile device and the first control signal may instruct the mobile device to mute or hold the active call. The processor may further configure the second command button, such as command button 322 shown in FIG. 3A, to control a second active call function of the mobile device, and the second control signal may instruct the mobile device to end the active call.

In some embodiments, the status of the mobile device, such as mobile device 102 shown in FIG. 1, may be indicative of an active alarm. The processor, such as processor 202 shown in FIG. 2, may configure the first command button, such as command button 320 shown in FIG. 3A, to control a first active alarm function of the mobile device, and the first control signal may instruct the mobile device to snooze the active alarm. The processor may further configure the second command button, such as command button 322 shown in FIG. 3A, to control a second active alarm function of the mobile device. Further, the second control signal may instruct the mobile device to turn off the active alarm.

In some embodiments, the processor, such as processor 202 shown in FIG. 2, may configure the first command button, such as command button 320 shown in FIG. 3A, to control a first function of the mobile device, such as mobile device 102 shown in FIG. 1, based on input from one or more users. In some embodiments, the processor may configure the second command button, such as command button 322 shown in FIG. 3A, to control a second function of the mobile device based on input from one or more users. In some embodiments, the processor may configure the first command button and the second command button to control respectively the first function of the mobile device and the second function of the mobile device based on input from one or more users.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. An apparatus for charging a mobile device, the apparatus comprising:
   a housing;
   charging circuitry configured to charge the mobile device;
   communications circuitry configured to receive first electronic information indicative of a first status of the mobile device and to receive second electronic information indicative of a second status of the mobile device during a connected period in which the mobile device is connected to the charging circuitry, wherein the first status and the second status are different;
   a first light source configured, during the connected period, to provide a first visual notification indicative of the first status of the mobile device;
   a second light source configured, during the connected period, to provide a second visual notification indicative of the second status of the mobile device, wherein the first visual notification and the second visual notification are different;
   a first command button configured, during the connected period, to control a first function of the mobile device, wherein the first function is associated with the first status of the mobile device; and
   a second command button configured, during the connected period, to control a second function of the mobile device, wherein the second function is associated with the second status of the mobile device, wherein the first function and the second function are different,
      wherein the communications circuitry is further configured, during the connected period, to transmit, to the mobile device in response to a first actuation of the first command button, a first control signal that instructs the mobile device to perform the first function, and
      wherein the communications circuitry is further configured, during the connected period, to transmit, to the mobile device in response to a second actuation of the second command button, a second control signal that instructs the mobile device to perform the second function.

2. The apparatus of claim 1, wherein the charging circuitry comprises a USB connector and an electrical plug.

3. The apparatus of claim 1, wherein the charging circuitry comprises a wireless charger configured to wirelessly charge the mobile device.

4. The apparatus of claim 1, wherein the communications circuitry is configured to receive the first electronic information and the second electronic information from the mobile device.

5. The apparatus of claim 4, wherein the communications circuitry is configured to transmit the first control signal and the second control signal to the mobile device.

6. The apparatus of claim 1, wherein the communications circuitry is configured to receive the electronic information indicative of the status of the mobile device from a remote server.

7. The apparatus of claim 1, wherein the first light source comprises an LED notification disc.

8. The apparatus of claim 7, wherein the LED notification disc comprises an LED array.

9. The apparatus of claim 7, wherein the LED notification disc comprises an optical waveguide.

10. The apparatus of claim 1, wherein the first visual notification comprises a first color of light, and wherein the second visual notification comprises a second color of light, wherein the first color and the second color are different.

11. The apparatus of claim 1, wherein the first visual notification comprises a solid light, and wherein the second visual notification comprises a blinking light.

12. The apparatus of claim 1, wherein the first status of the mobile device is indicative of an incoming call, and wherein the second status of the mobile device is indicative of an active alarm.

13. The apparatus of claim 1,
wherein the first command button is configured to control an incoming call function of the mobile device, and wherein the first control signal instructs the mobile device to answer the incoming call,
wherein the second command button is configured to control an active alarm function of the mobile device, and wherein the second control signal instructs the mobile device to snooze the active alarm.

14. An apparatus for providing a visual notification indicative of a status of a mobile device and controlling a function of the mobile device, the apparatus comprising:
a housing;
charging circuitry configured to charge the mobile device;
communications circuitry configured to receive, from the mobile device, electronic information indicative of a status of the mobile device during a connected period in which the mobile device is connected to the charging circuitry, wherein the communications circuitry is further configured to transmit, to the mobile device, a control signal that instructs the mobile device to perform a function;
a light source configured to provide a visual notification;
a command button configured, during the connected period, to control a function of the mobile device; and
a processor in communication with the charging circuitry, the communications circuitry, the light source, and the command button, wherein the processor is configured, during the connected period in which the mobile device is connected to the charging circuitry, to
receive, from the communications circuitry, the electronic information indicative of the status of the mobile device,
determine the status of the mobile device based on the electronic information indicative of the status of the mobile device,
transmit, to the light source, an instruction to provide the visual notification based on the status,
configure the command button to control the function of the mobile device, wherein the function is associated with the status,
receive, in response to an actuation of the command button by a user, an electronic signal indicative of the actuation of the command button by the user, and
transmit, to the communications circuitry in response to the electronic signal indicative of the actuation of the command button, the control signal that instructs the mobile device to perform the function.

15. The apparatus of claim 14, wherein the light source comprises an LED notification disc.

16. The apparatus of claim 14, wherein the control signal is a first control signal, wherein the function of the mobile device is a first function of the mobile device, wherein the command button is a first command button,
wherein the communications circuitry is further configured to transmit, to the mobile device, a second control signal that instructs the mobile device to perform a second function,
wherein the apparatus further comprises a second command button configured to control a second function of the mobile device, and
wherein the processor is further configured to
configure the first command button to control the first function of the mobile device, wherein the first function is associated with the status,
receive, in response to a first actuation of the first command button by the user, a first electronic signal indicative of the first actuation of the first command button,
transmit, to the communications circuitry in response to the first electronic signal indicative of the first actuation of the first command button, the first control signal that instructs the mobile device to perform the first function,
configure the second command button to control the second function of the mobile device, wherein the second function is associated with the status,
receive, in response to a second actuation of the second command button by the user, a second electronic signal indicative of the second actuation of the second command button, and
transmit, to the communications circuitry in response to the second electronic signal indicative of the second actuation of the second command button, the second control signal that instructs the mobile device to perform the second function.

17. The apparatus of claim 16, wherein the status of the mobile device is indicative of an incoming call, and wherein the processor is further configured to
configure the first command button to control a first incoming call function of the mobile device, wherein the first control signal instructs the mobile device to answer the incoming call, and
configure the second command button to control a second incoming call function of the mobile device, wherein the second control signal instructs the mobile device to send the incoming call to voicemail.

18. The apparatus of claim 16, wherein the status of the mobile device is indicative of an active alarm, and wherein the processor is further configured to configure the first command button to control a first active alarm function of the mobile device, wherein the first control signal instructs the mobile device to snooze the active alarm, and configure the second command button to control a second active alarm function of the mobile device, wherein the second control signal instructs the mobile device to turn off the active alarm.

19. The apparatus of claim 14, wherein the apparatus further comprises input-output circuitry configured to receive command button configuration information, wherein the command button is further configured to control the function of the mobile device based on the command button configuration information, wherein the processor is in communication with the input-output circuitry, and wherein the processor is further configured to receive, from the input-output circuitry, the command button configuration information, and configure the command button to control the function of the mobile device based on the command button configuration information, wherein the function of the mobile device is associated with the status.

20. A method for providing a visual notification indicative of a status of a mobile device and controlling a function of the mobile device, the method comprising:

charging, by charging circuitry, the mobile device; and during a connected period in which the mobile device is connected to the charging circuitry, the method further comprises:

receiving, from communications circuitry, a status signal indicative of the status of the mobile device, determining, by processing circuitry, the status of the mobile device based on the status signal, transmitting, to a light source, an instruction to provide the visual notification based on the status, configuring a command button to control the function of the mobile device based on the status, receiving, in response to an actuation of the command button by a user, an electronic signal indicative of the actuation of the command button, and transmitting, to the communications circuitry, a control signal that instructs the mobile device to perform the function.

\* \* \* \* \*